(12) United States Patent
Matsumoto

(10) Patent No.: US 12,147,040 B2
(45) Date of Patent: Nov. 19, 2024

(54) VIRTUAL IMAGE DISPLAY DEVICE AND OPTICAL UNIT

(71) Applicant: SEIKO EPSON CORPORATION, Tokyo (JP)

(72) Inventor: Daiki Matsumoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 686 days.

(21) Appl. No.: 17/389,056

(22) Filed: Jul. 29, 2021

(65) Prior Publication Data

US 2022/0035164 A1 Feb. 3, 2022

(30) Foreign Application Priority Data

Jul. 30, 2020 (JP) ................. 2020-129071

(51) Int. Cl.
*G02B 27/01* (2006.01)
*G02B 26/08* (2006.01)
(52) U.S. Cl.
CPC ..... *G02B 27/0172* (2013.01); *G02B 26/0816* (2013.01); *G02B 2027/0118* (2013.01); *G02B 2027/0178* (2013.01)
(58) Field of Classification Search
None
See application file for complete search history.

(56) References Cited

U.S. PATENT DOCUMENTS

| 2020/0018966 | A1  | 1/2020 | Komatsu et al. |
| 2020/0050008 | A1* | 2/2020 | Seo ............. G02B 27/144 |
| 2022/0035164 | A1  | 2/2022 | Matsumoto |
| 2023/0194858 | A1  | 6/2023 | Xiao |

FOREIGN PATENT DOCUMENTS

| CN | 111290125 A | 6/2020 |
| JP | 2010-145674 A | 7/2010 |
| JP | 2020-008749 A | 1/2020 |

OTHER PUBLICATIONS

Jan. 31, 2024 Office Action issued in U.S. Appl. No. 17/388,570.
U.S. Appl. No. 17/388,570, filed Jul. 29, 2021 in the name of Matsumoto.

* cited by examiner

*Primary Examiner* — Bao-Luan Q Le
*Assistant Examiner* — Danell L Owens
(74) *Attorney, Agent, or Firm* — Oliff PLC

(57) ABSTRACT

A virtual image display device includes an image light generation device generating image light, a transmissive tilted mirror reflecting the image light from the image light generation device, and a concave transmissive mirror reflecting, toward the transmissive tilted mirror, the image light reflected by the transmissive tilted mirror, and a light shielding film is provided on the external side of the concave transmissive mirror.

12 Claims, 13 Drawing Sheets

VIRTUAL IMAGE DISPLAY DEVICE AND OPTICAL UNIT

The present application is based on, and claims priority from JP Application Serial Number 2020-129071, filed Jul. 30, 2020, the disclosure of which is hereby incorporated by reference herein in its entirety.

BACKGROUND

1. Technical Field

The present disclosure relates to a see-through type virtual image display device and an optical unit incorporated in the virtual image display device, and particularly to a virtual image display device and an optical unit of a type in which image light is reflected by a transmissive tilted mirror such that the light impinges on a concave transmissive mirror, and the reflection light from the concave transmissive mirror is observed through the transmissive tilted mirror.

2. Related Art

As a virtual image display device including a transmissive reflective surface and a concave mirror, a device including a prism member in which a transmissive reflective surface is incorporated is known, for example (see JP-A-2020-008749). It is disclosed that in this device, image light incident on the prism member is guided by totally reflecting it at a total reflection surface of the prism member toward the transmissive reflective surface, and the image light is reflected at the transmissive reflective surface toward the concave mirror disposed in front of the prism member.

In the virtual image display device disclosed in JP-A-2020-008749, the image light is emitted to the front side, and the image being displayed can be disadvantageously seen from the outside.

SUMMARY

A virtual image display device of an aspect of the present disclosure includes an image light generation device generating image light, a transmissive tilted mirror reflecting the image light from the image light generation device, and a concave transmissive mirror having a concave shape and reflecting, toward the transmissive tilted mirror, the image light reflected by the transmissive tilted mirror. The concave transmissive mirror includes a transmissive member, a reflection film, and a light shielding film. The transmissive member includes a first surface and a second surface opposing to the first surface. The reflection film on which the image light reflected by the transmissive tilted mirror is incident, the reflection film is provided along the first surface of the transmissive member. The light shielding film shields a part of the image light, the light shielding pattern film is provided along the second surface of the transmissive member.

DESCRIPTION OF EXEMPLARY EMBODIMENTS

First Embodiment

With reference to FIGS. 1 to 4 and the like, a virtual image display device according to the present disclosure of the first embodiment and an optical unit incorporated in the virtual image display device are described below.

Figure 1:
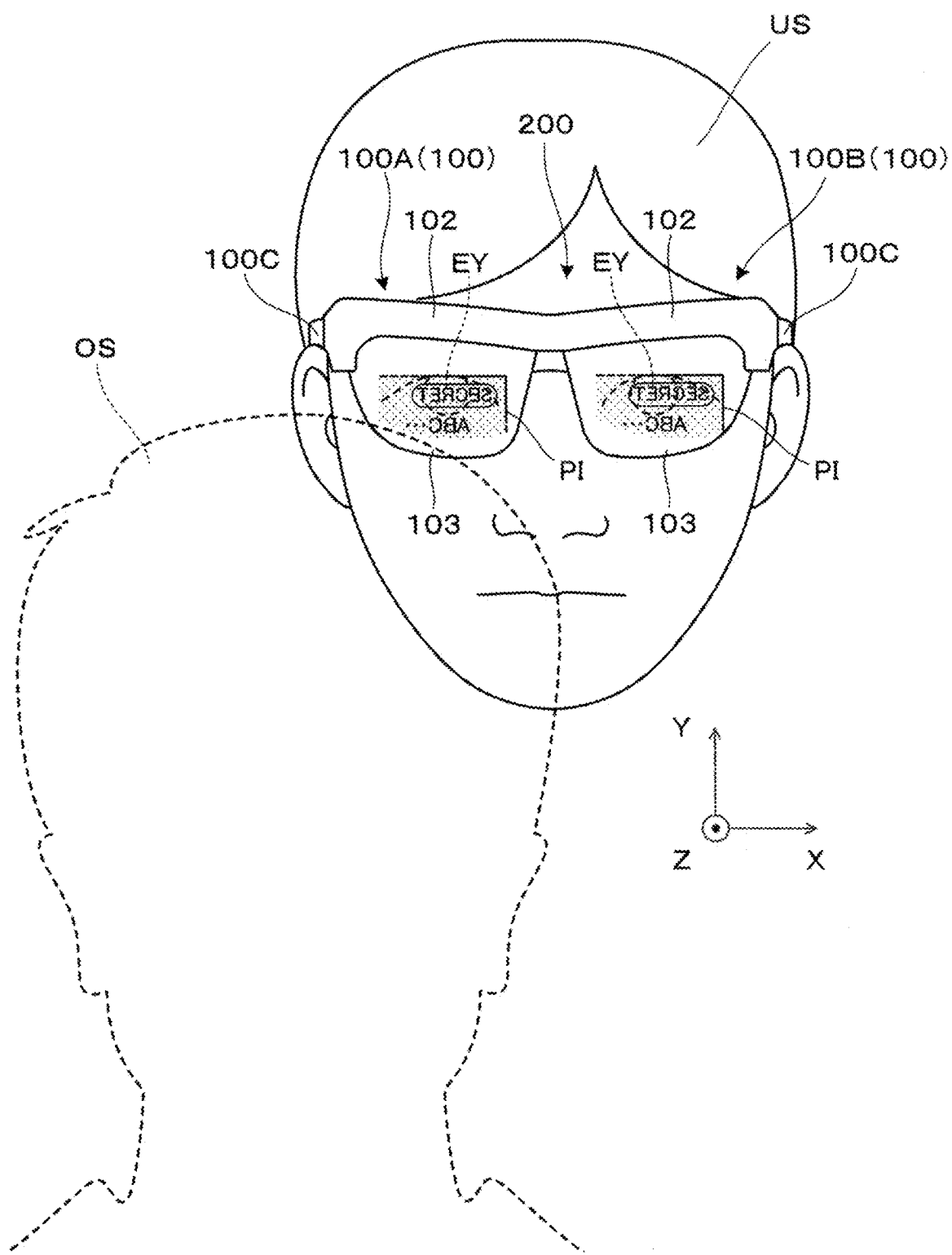
FIG. 1 is an exterior appearance view for describing a mounted state of a virtual image display device of a first embodiment.

FIG. 1 is a drawing for describing a mounted state of a head-mounted display (hereinafter referred to also as an HMD) 200, and with the HMD 200, a viewer or a wearer US wearing it can recognize an image as a virtual image. In FIG. 1 and the like, X, Y, and Z are orthogonal coordinate systems, the +X direction corresponds to the lateral direction in which eyes EY of the viewer or the wearer US wearing the HMD 200 or a virtual image display device 100 are located, the +Y direction corresponds to an upward direction orthogonal to the lateral direction in which the eyes EY are located for the wearer US, and the +Z direction corresponds to a forward direction or a front direction for the wearer US. The ±Y direction is parallel to the vertical axis or the vertical direction.

The HMD 200 includes a right-eye first display device 100A, a left-eye second display device 100B, and a pair of temple-shaped support devices 100C that supports the display devices 100A and 100B. The first display device 100A is composed of a display driving part 102 disposed in the upper part, and an exterior member 103 with an eyeglass-lens shape that covers the front side of the eye. Likewise, the second display device 100B is composed of the display driving part 102 disposed in the upper part and the exterior member 103 with an eyeglass-lens shape that covers the front side of the eye. The support device 100C supports the upper end side of the exterior member 103 through the display driving part 102. The first display device 100A and the second display device 100B are optically reversed left and right, and therefore the right-eye first display device 100A is described as a representative of the virtual image display device 100.

Figure 2:
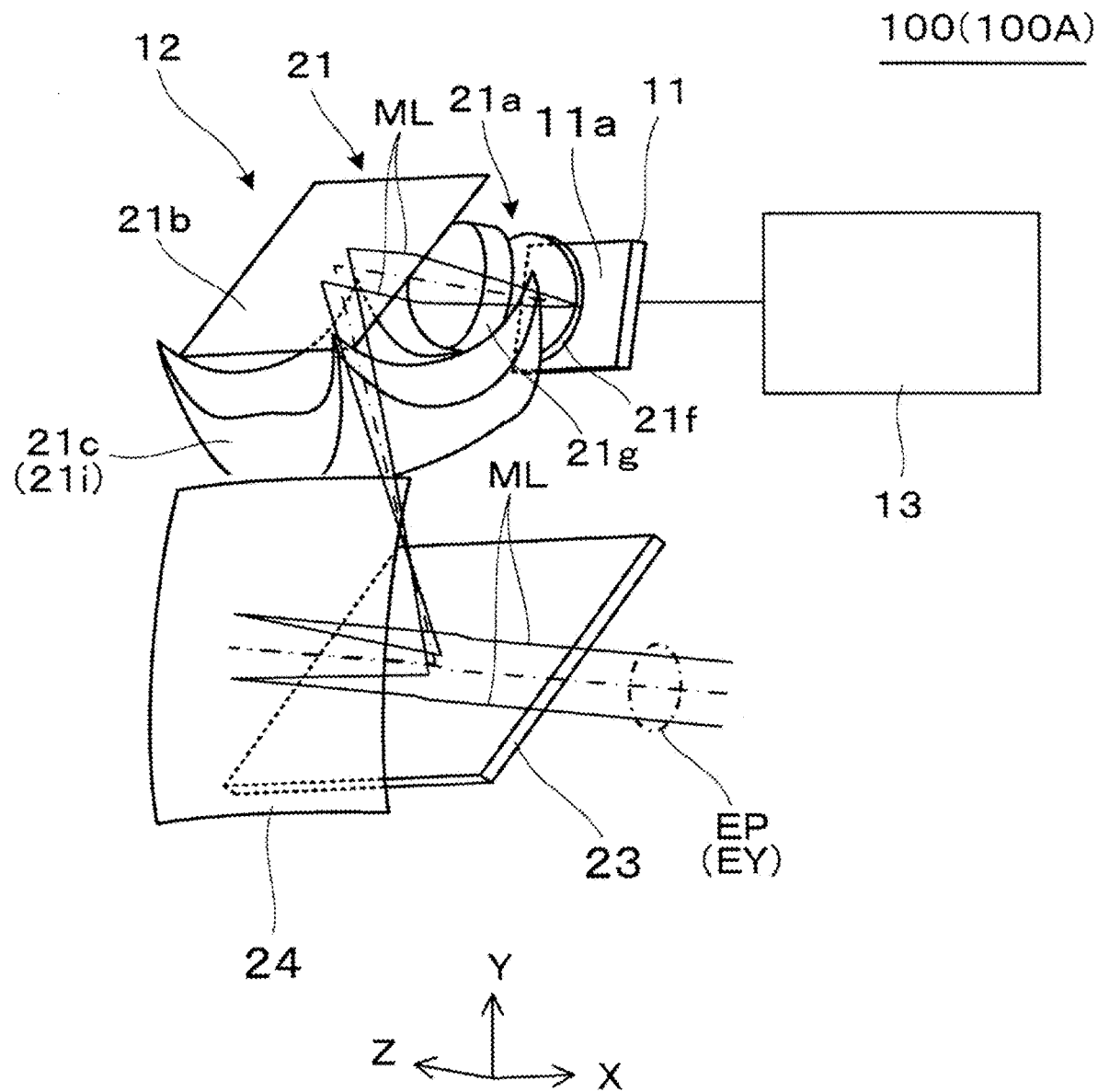
FIG. 2 is a schematic perspective view for describing a structure of the virtual image display device of FIG. 1.
Figure 3:
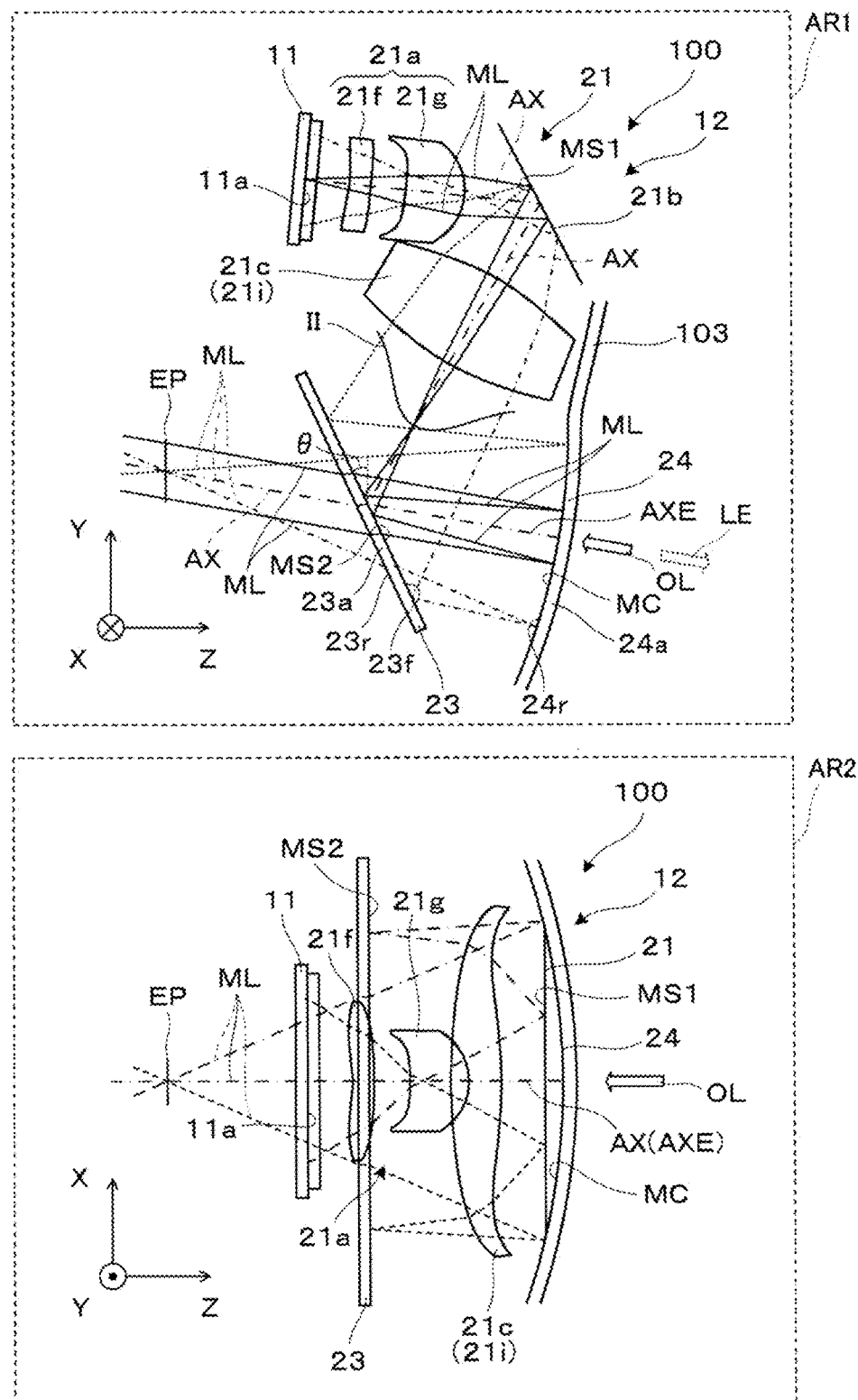
FIG. 3 is a side sectional view and a partial sectional plan view of the virtual image display device of FIG. 1.

FIG. 2 is a perspective view for describing the virtual image display device 100 serving as the right-eye display device 100A, and FIG. 3 is a drawing for describing an optical structure of the virtual image display device 100. In FIG. 3, a first region AR1 is a side sectional view of an image light generation device 11 and an optical unit 12, and a second region AR2 is a plan view illustrating a partial cross section along light paths of the image light generation device 11 and the optical unit 12.

As illustrated in FIG. 2, the virtual image display device 100 includes the image light generation device 11, the optical unit 12 and a display control circuit 13. It should be noted that, in this specification, one in which the display control circuit 13 is omitted is also referred to as the virtual image display device 100 from the viewpoint of achieving the optical function. The image light generation device 11 and the display control circuit 13 are supported in the outer frame of the display driving part 102 illustrated in FIG. 1, and a part of the optical unit 12 is also supported in the outer frame of the display driving part 102.

The image light generation device 11 is a self-luminous display device, such as, for example, an organic EL (organic electroluminescence, Organic Electro-Luminescence) display, and forms a color still image or a moving image on a two-dimensional display surface 11a. The image light generation device 11 performs a display operation by being driven by the display control circuit 13. The image light generation device 11 is not limited to an organic EL display, and may be replaced with a display of an inorganic EL, an LED array, an organic LED, a laser array, a quantum dot light emission element and the like. The image light generation device 11 is not limited to a self-luminous image light generation device, and may be a device composed of a light modulation element such as an LCD and configured to form an image by illuminating the light modulation element using a light source such as a backlight. As the image light generation device 11, a liquid crystal on silicon (LCOS (registered trademark)), a digital-micromirror-device and the like may be used in place of an LCD.

As illustrated in FIG. 2 and FIG. 3, the optical unit 12 includes a projection optical system 21, a transmissive tilted mirror 23, and a concave transmissive mirror 24. The term "transmissive mirror" of the concave transmissive mirror 24 means that it is a mirror that partially transmits light. The light path from the image light generation device 11 to the projection optical system 21 is disposed on the upper side of the transmissive tilted mirror 23. To be more specific, the image light generation device 11 and the projection optical system 21 are disposed in a space sandwiched between a tilted plane extended from the transmissive tilted mirror 23 and a vertical plane extended upward from the upper end of the concave transmissive mirror 24.

The projection optical system 21 projects image light ML emitted from the image light generation device 11. The projection optical system 21 converges the image light ML emitted from the image light generation device 11 to form an image, and then injects it into the transmissive tilted mirror 23. That is, the projection optical system 21 is disposed between the image light generation device 11 and the transmissive tilted mirror 23 on the light path. The projection optical system 21 includes a first lens system 21a, a turning mirror 21b and a second lens system 21c. The first lens system 21a includes two lenses, 21f and 21g, in the example illustrated in FIG. 3, but may be composed of one lens or three or more lenses. The second lens system 21c includes one lens 21i in the example illustrated in FIG. 3, but may be two or more lenses. The lenses 21f, 21g and 21i may be spherical lenses, non-spherical lenses, free curved surface lenses, and the like. The turning mirror 21b is a plate-shaped optical member, and includes a flat reflective surface MS1. The flat reflective surface MS1 of the turning mirror 21b is composed of a metal film or a dielectric multilayer film. The flat reflective surface MS1 is obtained by forming a reflective film composed of a single film or a multilayer film made of metal such as Al or Ag or other materials by vapor deposition and the like on a flat plate surface. The turning mirror 21b bends an optical axis AX in a direction of an acute angle smaller than 90° in the YZ plane. The image light ML that travels through the first lens system 21a in the +Z direction, which is the forward direction, is bent by the turning mirror 21b in an oblique and rear downward direction between the −Y direction and the −Z direction, and then the light impinges on the transmissive tilted mirror 23 through the second lens system 21c.

The transmissive tilted mirror 23 is an optical member in a form of a flat plate, and includes a flat reflective surface MS2 having transmissivity. The transmissive tilted mirror 23 is a mirror in which a metal film or a dielectric multilayer film formed as a transmissive reflective film is formed on one surface 23f of a parallel flat plate 23a having a uniform thickness and transmissivity, and the transmissive reflective film functions as the flat reflective surface MS2. The reflectance and transmittance of the flat reflective surface MS2 is set to approximately 50%, for example. It is to be noted that an anti-reflective film is formed on another surface 23r of the parallel flat plate 23a. The transmissive tilted mirror 23 bends the optical axis AX in a substantially orthogonal direction in the YZ plane. The image light ML that travels in a direction slightly tilted rearward with respect to the −Y direction, which is the downward direction, through the first lens system 21a of the projection optical system 21 is bent by the transmissive tilted mirror 23 in a direction slightly tilted downward with respect to the +Z direction, which is the forward direction, such that the light impinges on the concave transmissive mirror 24. The transmissive tilted mirror 23 is disposed between the concave transmissive mirror 24 and an exit pupil EP where the eye EY or the pupil hole is located, so as to cover the exit pupil EP. The transmissive tilted mirror 23 can be directly or indirectly fixed to the outer frame of the display driving part 102 illustrated in FIG. 1 such that the positional relationship with the concave transmissive mirror 24 and the like can be appropriately set.

With respect to the XY plane extending in the vertical direction as a reference, the transmissive tilted mirror 23 or the flat reflective surface MS2 are tilted by an angle θ=approximately 20 to 40° in the counterclockwise direction around the X axis as viewed from the −X side (see the lateral sectional view of FIG. 3). As described above, the transmissive tilted mirror 23 is disposed such that the angle between the Y axis, which is a vertical axis, and the transmissive tilted mirror 23 is smaller than 45°. When the angle between the Y axis and the transmissive tilted mirror 23 is greater than 45°, the transmissive tilted mirror 23 is tilted than the standard (normal) state, and the thickness of the transmissive tilted mirror 23 in the Z-axis direction increases, whereas when the angle between the Y axis and the transmissive tilted mirror 23 is smaller than 45°, the transmissive tilted mirror 23 is raised than the standard (normal) state, and the thickness of the transmissive tilted mirror 23 in the Z-axis direction is reduced. That is, by setting the angle between the Y axis and the transmissive tilted mirror 23 to an angle smaller than 45° as in the present embodiment, an installation where the transmissive tilted mirror 23 largely protrudes in the −Z direction of the back surface with respect to the concave transmissive mirror 24 as a reference can be avoided, and the increase of the thickness of the virtual image display device 100 or the optical unit 12 in the Z direction in the front-rear direction can be avoided.

The concave transmissive mirror 24 is an optical member having a shape recessed to the exit pupil EP, and includes a transmissive reflective surface MC having transmissivity. The concave transmissive mirror 24 has a light convergence function, collimates the image light ML reflected and scattered at the transmissive tilted mirror 23, and enters the light into the exit pupil EP through the transmissive tilted mirror 23. The concave transmissive mirror 24 includes a surface recessed to the exit pupil EP and a convex surface toward the external side that is obtained by inverting a recessed surface, and thus has a uniform thickness while having a curved shape. The transmissive member 24a of the concave transmissive mirror 24 is a base material that defines the external shape of the concave transmissive mirror 24. The transmissive member 24a has a transmissivity for transmitting light without a substantial loss. On one surface 24r of the transmissive member 24a, a metal film or a dielectric multilayer film is formed as a transmissive reflective film, and such a transmissive reflective film functions as the concave transmissive reflective surface MC. The reflectance of the transmissive reflective surface MC is set to approximately 20 to 50%, for example. The transmissive reflective surface MC is not limited to a spherical surface, and may be an aspherical surface. The image light ML travelling forward after being reflected by the transmissive tilted mirror 23 is reflected back to the transmissive tilted mirror 23 by the concave transmissive mirror 24 such that the light is partially transmitted through the transmissive tilted mirror 23 and collected at the exit pupil EP. An emission light axis AXE from the transmissive tilted mirror 23 toward the concave transmissive mirror 24 coincides with the optical axis AX folded back at the concave transmissive mirror 24 toward the exit pupil EP. The image light ML impinges on the entirety of the transmissive reflective surface MC of the concave transmissive mirror 24 from an almost perpendicular direction, and thus has a high optical symmetry. The concave transmissive mirror 24 covers the transmissive tilted mirror 23 on the external side. The transmissive tilted mirror 23 is disposed between the concave transmissive mirror 24 and an exit pupil EP where the eye EY or the pupil hole is located, so as to cover the exit pupil EP. In the optical system illustrated in the drawing, the emission light axis AXE, which is an axis line from the transmissive tilted mirror 23 toward the concave transmissive mirror 24 and is also an axis line from the concave mirror 24 toward the center of the exit pupil EP, extends with a downward tilt of approximately 10° with respect to the +Z direction as the forward direction. With the emission light axis AXE tilted downward on the front side at approximately 10° with respect to the Z axis, which is a horizontal axis, the fatigue of the eye EY of the wearer US observing virtual images can be reduced.

The concave transmissive mirror 24 is incorporated to constitute a part of the transmissive exterior member 103 illustrated in FIG. 1. That is, by providing a transmissive or non-transmissive plate-shaped member in an extended manner around the concave transmissive mirror 24, the exterior member 103 including the concave transmissive mirror 24 can be achieved. The exterior member 103 is not limited to the eyeglass-lens form, and may have various outlines or exterior appearances.

Regarding the light paths, the image light ML from the image light generation device 11 is focused and bent by the projection optical system 21 to form an image, and then impinges on the transmissive tilted mirror 23. The image light ML that is reflected by, for example, approximately 50% at the transmissive tilted mirror 23 impinges on the concave transmissive mirror 24 so as to be reflected at the transmissive reflective surface MC at a reflectance of approximately 50% or less, for example. The image light ML reflected at the concave transmissive mirror 24 passes through the transmissive tilted mirror 23 and impinges on the exit pupil EP where the eye EY or the pupil hole of the wearer US is located. Here, the exit pupil EP is an eye point of the optical unit 12 where the eye EY is assumed to be disposed, and light from each point of the display surface 11a of the image light generation device 11 impinges in a collected manner in one place at an angle that allows observation of virtual images. An intermediate image II is formed between the transmissive tilted mirror 23 and the projection optical system 21. The intermediate image II is an image obtained by appropriately enlarging an image formed on the display surface 11a of the image light generation device 11. External light OL transmitted through the concave transmissive mirror 24 also impinges on the exit pupil EP. That is, the wearer US wearing the HMD 200 can observe a virtual image of the image light ML superimposed on external images.

It is to be noted that while the concave transmissive mirror 24 transmits the external light OL, it also transmits the image light ML, and thus generates leaked light LE on the front side of the concave transmissive mirror 24. If the intensity of the leaked light LE is high, a third party OS existing around the wearer US can observe a part PI of the image displayed on the display surface 11a of the image light generation device 11 (see FIG. 1). In contrast, in the present embodiment, as described later, a light shielding pattern film 41 (see FIG. 4) is provided on the external side of a transmissive reflective film 24b in the concave transmissive mirror 24 to suppress the leaked light LE, and thus the situation where the part PI of the image can be observed by the third party OS is avoided.

A structure of the concave transmissive mirror 24 is described below with reference to FIG. 4. The concave transmissive mirror 24 includes the transmissive member 24a that is a supporting body 61 for maintaining the entire shape, the transmissive reflective film 24b formed on the inner side (the exit pupil EP side in FIG. 3) of the transmissive member 24a, the light shielding pattern film1 41 formed on the external side of the transmissive member 24a, and the anti-reflection film 24c formed on the external side of the light shielding pattern film 41. It is to be noted that the anti-reflection film 24c may be omitted.

From the viewpoint of ensuring the strength of the shape, the concave transmissive mirror 24 or the transmissive member 24a has a thickness of 1 mm or greater, but preferably has a thickness of 2 mm or smaller from the viewpoint of weight reduction. The transmissive member 24a is formed of an optically transparent resin such as acrylic resin and polycarbonate resin, and transmits the image light ML without attenuation. The transmissive member 24a is formed by injection molding, for example.

The transmissive reflective film 24b functions as the transmissive reflective surface MC, and reflects the image light ML at a desired reflectance. The transmissive reflective film 24b has a structure in which a metal film is covered with a protective film, and can be formed by depositing metal or metal oxide of aluminum, silver and the like on a first surface 2a of the transmissive member 24a on the exit pupil EP side. At this time, the reflectance of the transmissive reflective film 24b can be adjusted through adjustment of the thickness of the metal film the like. The transmissive reflective film 24b is not limited to the metal film, and may be formed of a dielectric multilayer film. To be more specific, several types of metal oxide films are stacked in the film thickness based on the optical design, on the first surface 2a of the transmissive member 24a. In this manner, the reflectance of the transmissive reflective film 24b can be substantially equalized in the wavelength range of each color included in the image light ML, and thus the transmissive reflective film 24b can reflect the image light ML at a desired reflectance over the entire wavelength range. It is to be noted that it is not necessary to form the transmissive reflective film 24b directly on the transmissive member 24a. For example, the transmissive member 24a may be covered with a hard coat film and the transmissive reflective film 24b may be formed on top of that.

The light shielding pattern film 41 is configured to perform partial light shielding, and is provided in an emission side surface, which is the external side of the transmissive reflective surface MC formed in the concave transmissive mirror 24, or more specifically, in a second surface 2b of the transmissive member 24a. Here, the light shielding pattern film 41 includes one discretely formed in the emission side surface of the concave transmissive mirror 24. The light shielding pattern film 41 suppresses emission, to the external side, of emission light passed through the transmissive reflective film 24b. That is, the light shielding pattern film 41 formed on the emission side surface of the concave transmissive mirror reduces the image light transmitted through the transmissive reflective surface MC.

Figure 5:
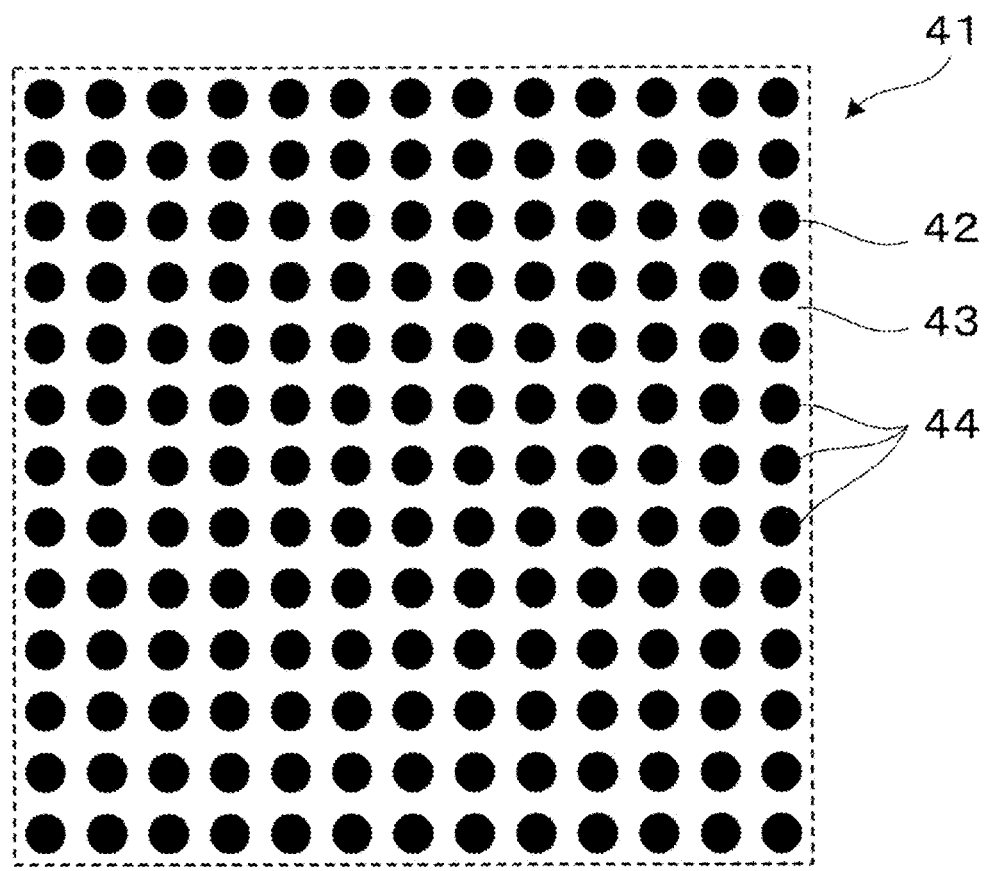
FIG. 5 is an enlarged front view illustrating the concave transmissive mirror.

FIG. 5 is an enlarged front view illustrating a structure of the light shielding pattern film 41. The light shielding pattern film 41 includes a light reduction region 42 and a transmissive region 43. With the light reduction region 42 of the light shielding pattern film 41, the image light ML transmitted through the transmissive reflective surface MC can be reduced. The transmissive region 43 can transmit substantially 100% of the incident light. The light reduction region 42 is a region in which a plurality of pattern elements 44 is arranged on two-dimensionally grid points. FIG. 5 illustrates a part of the light shielding pattern film 41, and the pattern elements 44 are arranged in the entirety of the light shielding pattern film 41. The pattern element 44 has one of a full absorption function and a partial absorption function. Here, the full absorption includes a case including several % of transmission, reflection, scattering or the like. Each of the pattern elements 44 that constitutes the light shielding pattern film 41 absorbs the image light ML at a desired absorptivity. In this manner, the absorptivity at the light shielding pattern film 41 can be adjusted by the installation, shape, pitch, area occupancy in the entirety of the transmissive reflective surface MC and the like of the pattern element 44. Regarding the entirety of the light shielding pattern film 41, it is possible to achieve the desired light reduction, such as reduction of the transmittance to 1/2 by setting the absorptivity to 1/2, for example.

The pattern element 44 has a circular shape, a triangular shape, polygonal shape, a star shape or the like, for example. In the example illustrated in FIG. 5, the pattern element 44 has a circular shape. In the circular pattern corresponding to the pattern element 44, the center of the circular shape is arranged on the grid point. The pattern element 44 is arranged in a density that does not cause diffraction. The pattern element 44 can be arranged with regularity, as in the illustrated example, but it is more desirable to be randomly arranged with no regularity.

The size of the pattern element 44 is approximately hundreds of micrometers to 3 mm, preferably approximately hundreds of micrometers to 2 mm. The pattern element 44 has a pitch of 100 μm to 2 mm such that diffraction is not caused in the light shielding pattern film 41. The thickness of the pattern element 44 is 100 μm or smaller, for example. It is to be noted that a thickness of approximately 100 μm is required in the case where the pattern element 44 is of the full absorption type, but the thickness may be smaller than 100 μm in the case where the pattern element 44 is of the partial absorption type with a transmittance of 50%, for example.

Figure 4:
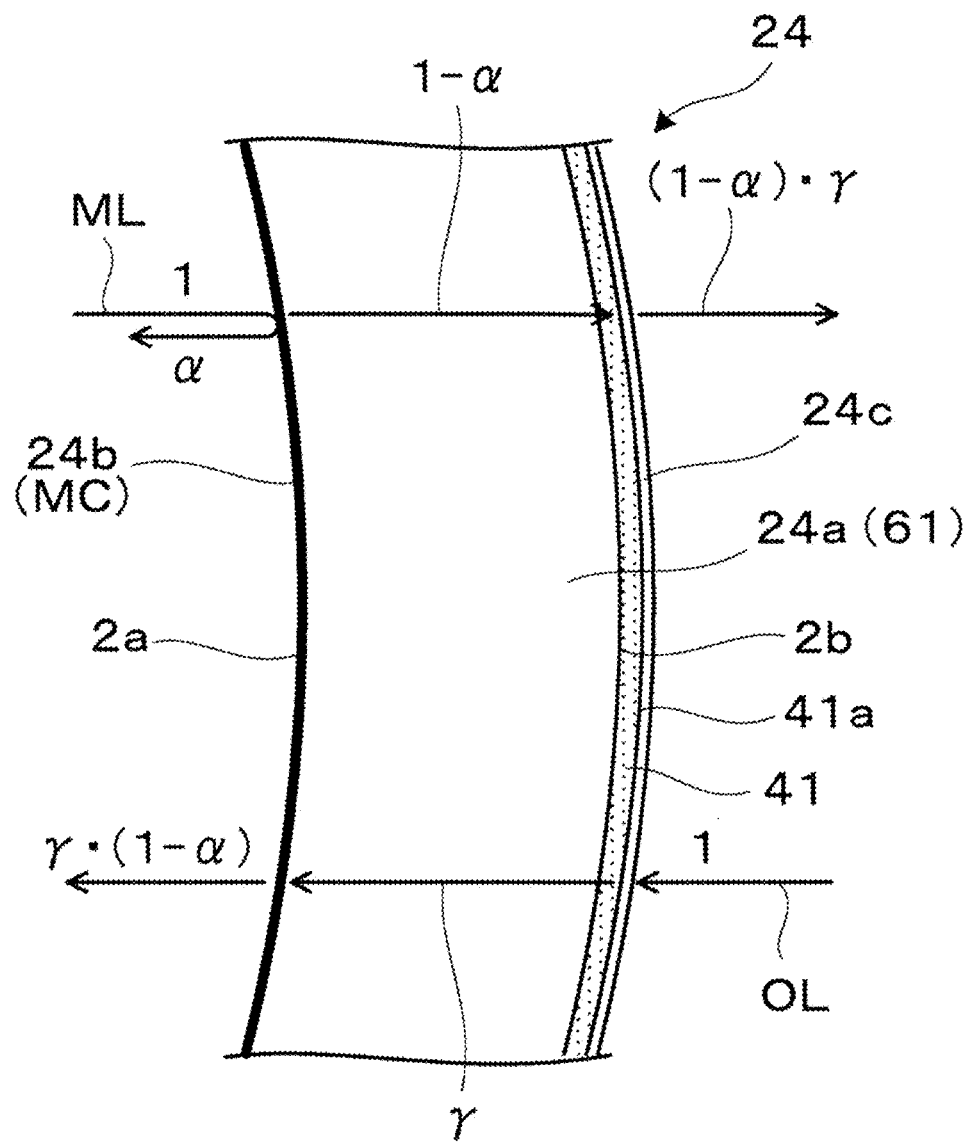
FIG. 4 is an enlarged sectional view illustrating a concave transmissive mirror.

The light shielding pattern film 41 can be formed by patterning a metal thin film on the external side surface of the resin that constitutes the transmissive member 24a illustrated in FIG. 4, i.e., on the second surface 2b, for example. The metal thin film is formed as a multilayer film by vapor deposition, sputtering and the like using materials such as metals such as Ag, Cr and Al and dielectric materials, for example. The patterning may be performed by etching, mask vapor deposition, or liftoff. In addition, the light shielding pattern film 41 may be pattern-formed by applying an absorber such as a carbon. In addition, the light shielding pattern film 41 may be formed by pasting a resin film of polyester, polycarbonate or the like colored in a black or grey pattern.

The resin film has the advantage of being resistant to scattering when the concave transmissive mirror 24 is broken. It is to be noted that the pattern element 44 may be formed by printing and/or ink-jet printing.

The anti-reflection film 24c prevents the image light ML passed through the transmissive reflective film 24b and the light shielding pattern fil 41 from traveling backward and forming ghosts. The anti-reflection film 24c is a dielectric multilayer film. The anti-reflection film 24c is formed by stacking several types of metal oxide films in a film thickness in accordance with the optical design on an external surface 41a of the light shielding pattern fil 41. It is to be noted that the anti-reflection film 24c may not be directly formed on the light shielding pattern filml 41. For example, the light shielding pattern film 41 may be covered with a hard coat film, and the anti-reflection film 24c may be formed on top of that. When the hard coat film is provided, the hard coat film constitutes the transmissive region 43 except for the light reduction region 42 or the pattern element 44 in the light shielding pattern film 41.

Assuming that the reflectance of the transmissive reflective film 24b is α and the transmittance of the entirety or average of the light shielding pattern film 41 is γ, the image light ML is attenuated to $(1-\alpha)$ from the original state via the transmissive reflective film 24b, and attenuated to $(1-\alpha)\cdot\gamma$ on average from the original state by being passed through the light shielding pattern fil 41. In the case where the reflectance α and the transmittance γ are 1/2, for example, the intensity of the image light ML emitted to the external side of the concave transmissive mirror 24 is attenuated to 1/4. It is to be noted that the external light OL is attenuated to $\gamma\cdot(1-\alpha)$ on average by the concave transmissive mirror 24. In the case where the reflectance α and the transmittance γ are 1/2, for example, the intensity of the external light OL that reaches the transmissive tilted mirror 23 through the concave transmissive mirror 24 is attenuated to 1/4. From the above, with the concave transmissive mirror 24 used in the present embodiment, it is easier to prevent other persons from observing the image light ML while ensuring the see-through property, and the privacy can be improved.

Figure 6:
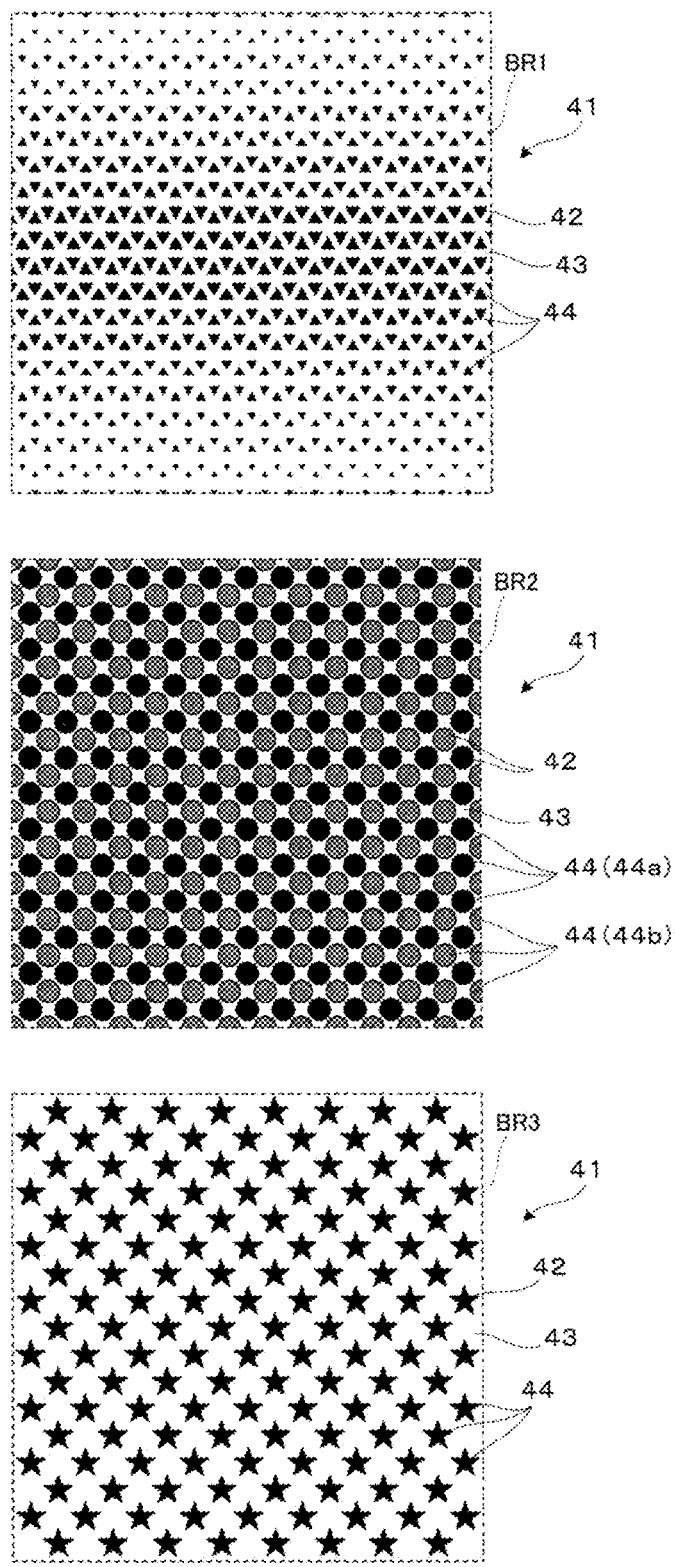
FIG. 6 is an enlarged front view illustrating a concave transmissive mirror of a modification.

With reference to FIG. 6, a first to third modifications of the concave transmissive mirror 24 illustrated in FIG. 5 are described below. In FIG. 6, a first region BR1 is an enlarged front view of the light shielding pattern fil 41 of the first modification, a second region BR2 is an enlarged front view of the light shielding pattern film 41 of the second modification, and a third region BR3 is an enlarged front view of the light shielding pattern film 41 of a third modification.

In the case of the first modification illustrated in the first region BR1 of FIG. 6, the triangular pattern corresponding to the pattern element 44 that constitutes the light shielding pattern film 41 is arranged such that the gravity center of the triangle is arranged on the grid point and the area of the triangular shape gradually decreases from the center of the concave transmissive mirror 24 in the up/down direction, i.e., the Y direction or the vertical direction of FIG. 2.

In the case of the second modification illustrated in the second region BR2 of FIG. 6, the circular pattern corresponding to the pattern element 44 that constitutes the light shielding pattern film 41 is denser than the pattern illustrated in FIG. 5. In addition, the light shielding pattern fil 41 includes the pattern elements 44 having different absorptivities. In the example illustrated in the drawing, in the light shielding pattern fil 41, lines of the pattern elements 44a with an absorptivity of 100% and lines of the pattern elements 44b with an absorptivity of 50% are alternately arranged, for example. It is to be noted that in the light shielding pattern fil 41, by increasing the area occupied by the pattern elements 44a and 44b, light emitted to the outside is reduced, and the privacy can be improved.

In the case of the third modification illustrated in the third region BR3 of FIG. 6, the star pattern corresponding to the pattern element 44 that constitutes the light shielding pattern film 41 is arranged such that the center of gravity of the star shape is arranged on the grid point.

Figure 7:
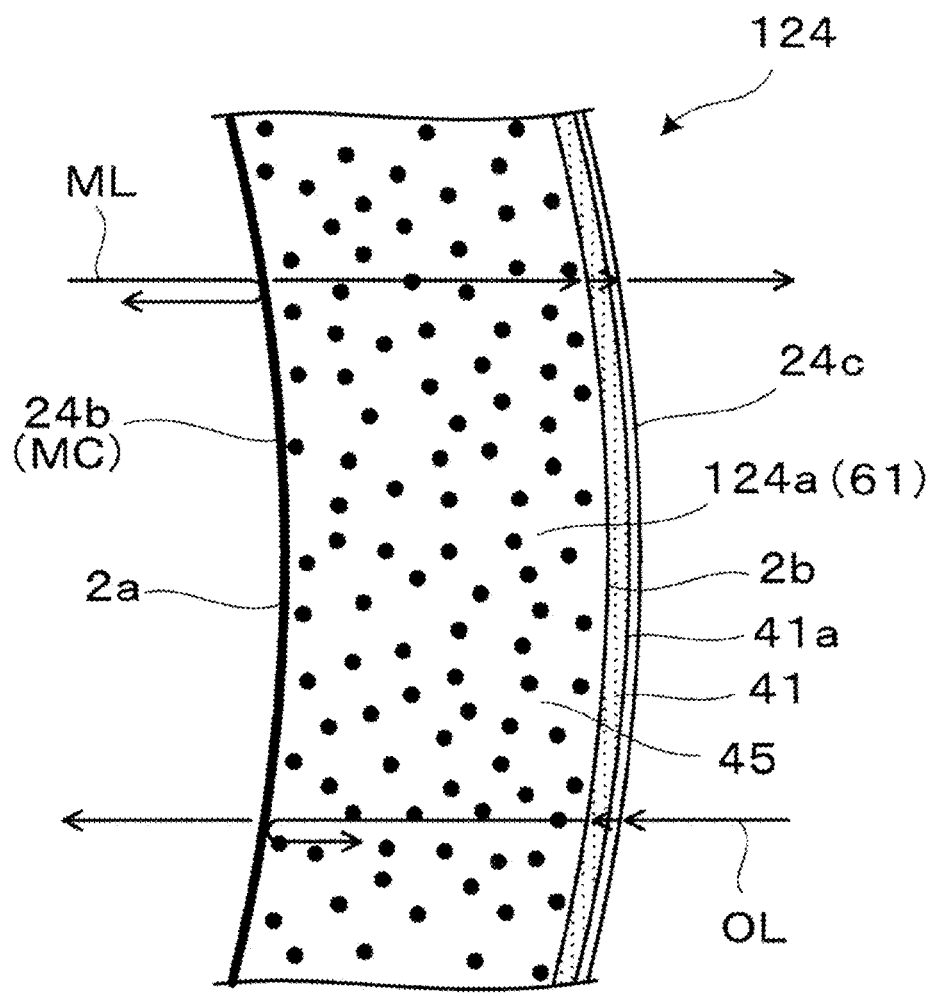
FIG. 7 is an enlarged sectional view illustrating a concave transmissive mirror of a modification.

With reference to FIG. 7, a fourth modification of the concave transmissive mirror 24 illustrated in FIG. 4 is described below. The concave transmissive mirror 124 illustrated in FIG. 7 includes the transmissive member 124a that is the supporting body 61, the transmissive reflective film 24b formed on the inner side of the transmissive member 124a, the light shielding pattern film 41 formed on the external side of the transmissive member 124a, and the anti-reflection film 24c formed on the external side of the light shielding pattern film 41.

The transmissive member 124a is an emission light absorption member 45, and suppresses emission, to the external side, of emission light passed through the transmissive reflective film 24b. With the transmissive member 124a, i.e., the emission light absorption member 45, desired light reduction, such as reduction of the transmittance to, for example, 1/2, can be achieved, and further light reduction of the transmittance to 1/2 can be achieved with the light shielding pattern film 41. The emission light absorption member 45 is composed of a material in which an absorber is dispersed in a base material of resin. More specifically, the emission light absorption member 45 is formed by adding nano particles of metal or the like with a size of approximately 10 to 100 nm to the resin. Here, when the nano particles dispersed in the emission light absorption member 45 are particles that absorb light with a good balance among three colors of RGB, light reduction maintaining the color tone of the transmitted light can be achieved. The transmittance of the emission light absorption member 45 can be adjusted through adjustment of the density of nano particles in the emission light absorption member 45 and the like. The metal nano particles are not limited to a single metal, and may be also be an alloy or the like. The emission light absorption member 45 is not limited to one in which nano particles are dispersed in a base material of resin, and it is possible to use one in which inorganic pigment and/or organic pigment is mixed in resin may be used. In this case, the color mixing can be achieved through selection and/or blending of the pigment. Further, resins with carbon fiber kneaded into them can also be used.

In the virtual image display device 100 of the first embodiment described above, the light shielding pattern fil 41 that performs partial light shielding is provided on the external side of the transmissive reflective surface MC formed in the concave transmissive mirror 24, and therefore the image light transmitted through the transmissive reflective surface MC and emitted to the external side is reduced by the light shielding pattern film 41, and, the image being displayed is less seen from the outside, thus increasing of the effect of suppressing information leakage. It is to be noted that through the use of the transmissive tilted mirror 23, the weight of the optical system of the virtual image display device can be reduced in comparison with a case where a prism member is used.

It is to be noted that the light reduction region 42 in the light shielding pattern film 41 may include one of a pattern element of a total reflection and a pattern element of a partial reflection. Here, the total reflection includes transmission, absorption, scattering and the like of several %. Each of the pattern elements 44 that constitutes the light shielding pattern fil 41 reflects the image light ML at a desired reflectance. In this manner, the reflectance at the light shielding pattern film 41 can be adjusted by the installation, shape, pitch, area occupancy in the entirety the transmissive reflective surface MC and the like of the pattern element 44. In the case where the light reduction region 42 includes the reflective pattern element 44, it is necessary to prevent generation of ghost, and the generation of ghost can be suppressed through absorption and/or interference by disposing a filter composed of a combination of a dielectric and a metal film on the inner side of the light shielding pattern film 41, for example. This filter may replace the emission light absorption member 45 illustrated in FIG. 7. In addition, the light reduction region 42 may be a combination of absorption pattern elements and reflective pattern elements.

In addition, although not illustrated in the drawing, the light shielding pattern film 41 may be formed in such a manner that it is embedded inside the transmissive member 24a, or may be formed between the transmissive reflective film 24b and the transmissive member 24a.

Second Embodiment

A virtual image display device of a second embodiment is described below. The virtual image display device and the like of the second embodiment are obtained by partially changing the virtual image display device of the first embodiment, and therefore the description for the common portions is omitted.

Figure 8:
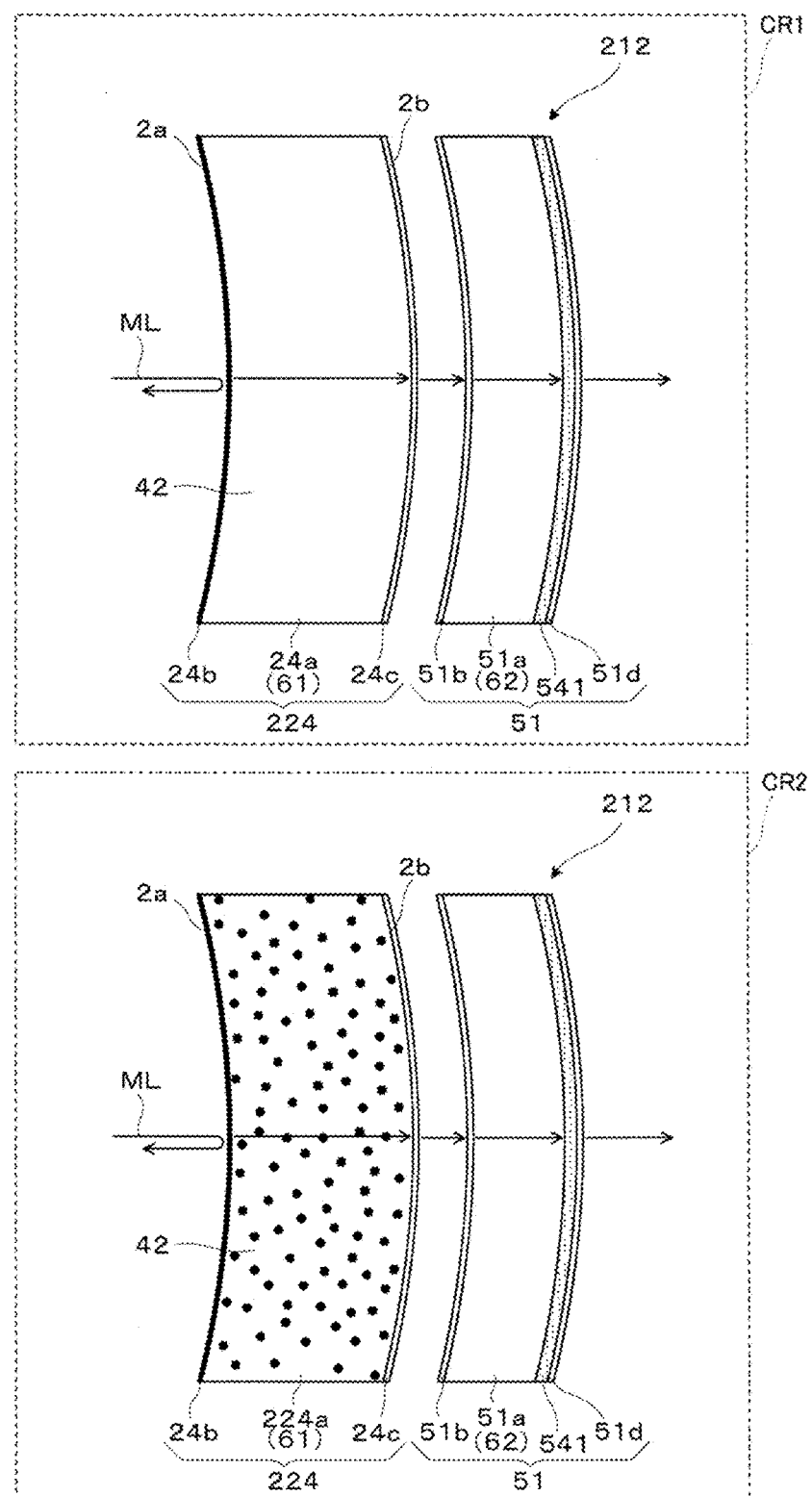
FIG. 8 is an enlarged sectional view illustrating a concave transmissive mirror of a second embodiment.

With reference to FIG. 8, an optical unit 212 incorporated in the virtual image display device of the second embodiment is described below.

In FIG. 8, a first region CR1 is an enlarged sectional view illustrating a region around the concave transmissive mirror 224 in the optical unit 212. A shade 51 is disposed on the external side of the concave transmissive mirror 224. The shade 51 is detachably fixed to the display driving part 102 illustrated in FIG. 1 and disposed to face the concave transmissive mirror 224 with a space therebetween. The concave transmissive mirror 224 does not include the light shielding pattern film 41 on the external side in the structure described in the first embodiment. The anti-reflection film 24c is formed in the second surface 2b, which is the emission side surface of the concave transmissive mirror 224. The shade 51 includes the transmissive member 51a that is a supporting body 62, the anti-reflection film 51b formed on the inner side of the transmissive member 51a, a light shielding pattern film 541 formed on the external side of the transmissive member 51a, and an anti-reflection film 51d formed on the external side of the light shielding pattern film 541. The light shielding pattern film 541 has the same structure as that illustrated in FIG. 5 and FIG. 6. The light shielding pattern film 541 reduces the incident intensity of external light on the concave transmissive mirror 224. In addition, the light shielding pattern film 541 suppresses emission, to the external side, of the image light ML passed through the concave transmissive mirror 224. That is, the image light ML passed through the concave transmissive mirror 224 is attenuated by the light shielding pattern film 541 formed in the shade 51, and thus the image being displayed can be made less seen from the outside. In addition, by providing the light shielding pattern film 41 in the shade 51, it is possible to achieve a good see-through property when the shade 51 is not used, and the improved privacy when the shade 51 is used.

In FIG. 8, a second region CR2 is an enlarged sectional view illustrating the optical unit 212 of a modification. In the example illustrated in the drawing, in place of the transmissive member 24a illustrated in the first region CR1, the entirety of the transmissive member 224a that is the supporting body 61 is the emission light absorption member 45 composed of a material in which an absorber is dispersed in the base material of resin. As in the first region CR1, the shade 51 includes the transmissive member 51a that is the supporting body 62, the anti-reflection film 51b formed on the inner side of the transmissive member 51a, the light shielding pattern film 541 formed on the external side of the transmissive member 51a, and the anti-reflection film 51d formed on the external side of the light shielding pattern film 541.

It is to be noted that in the optical unit 212 in the first and second regions CR1 and CR2, the light shielding pattern film may be provided also in the emission side surface of the concave transmissive mirror 224, for example.

Figure 9:
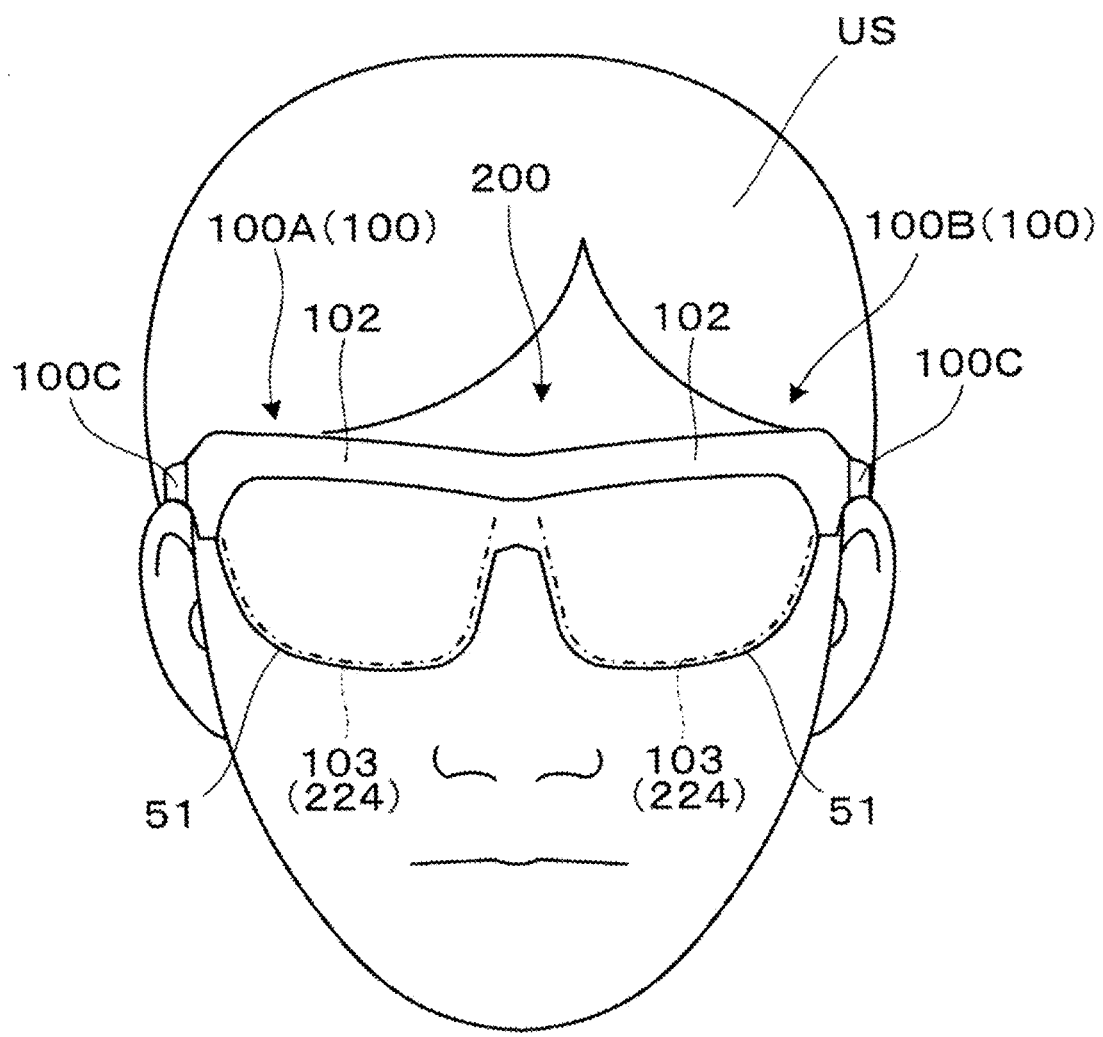
FIG. 9 is a front view for describing installation of a shade.

As illustrated in FIG. 9, the shade 51 is detachably fixed to the eyeglass-frame shaped portion provided in the display driving part 102. The shade 51 covers the entirety of exterior member 103 including the concave transmissive mirror 224. As a result, the shade 51 is provided in a region that covers the transmissive members 24a and 224a or the transmissive reflective film 24b formed on the inner side of the concave transmissive mirror 224. In the case where the transmissive reflective film 24b is provided in the concave transmissive mirror 224, the shade 51 is provided in a region that covers the transmissive reflective film 24b. In this manner, with the shade 51 that completely covers the transmissive reflective film 24b, the image light ML is less seen from the outside. It is to be noted that in the case where the transmissive reflective film 24b is not formed in the entire region of the concave transmissive mirror 224, the shade 51 may be configured to cover a narrow region that faces the transmissive reflective film 24b.

Third Embodiment

A virtual image display device of a third embodiment is described below. The virtual image display device and the like of the third embodiment are obtained by partially changing the virtual image display device of the first embodiment, and therefore the description for the common portions is omitted.

Figure 10:
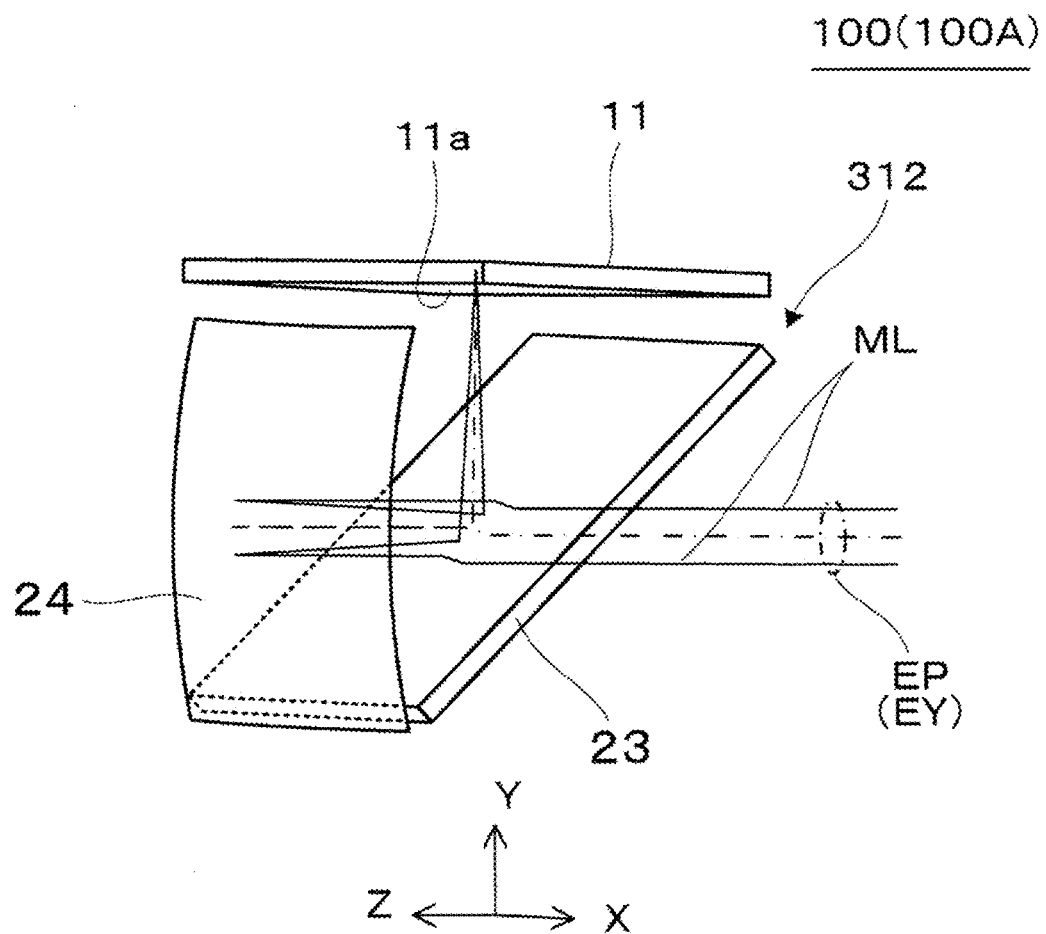
FIG. 10 is a schematic perspective view for describing a structure of a virtual image display device of a third embodiment.
Figure 11:
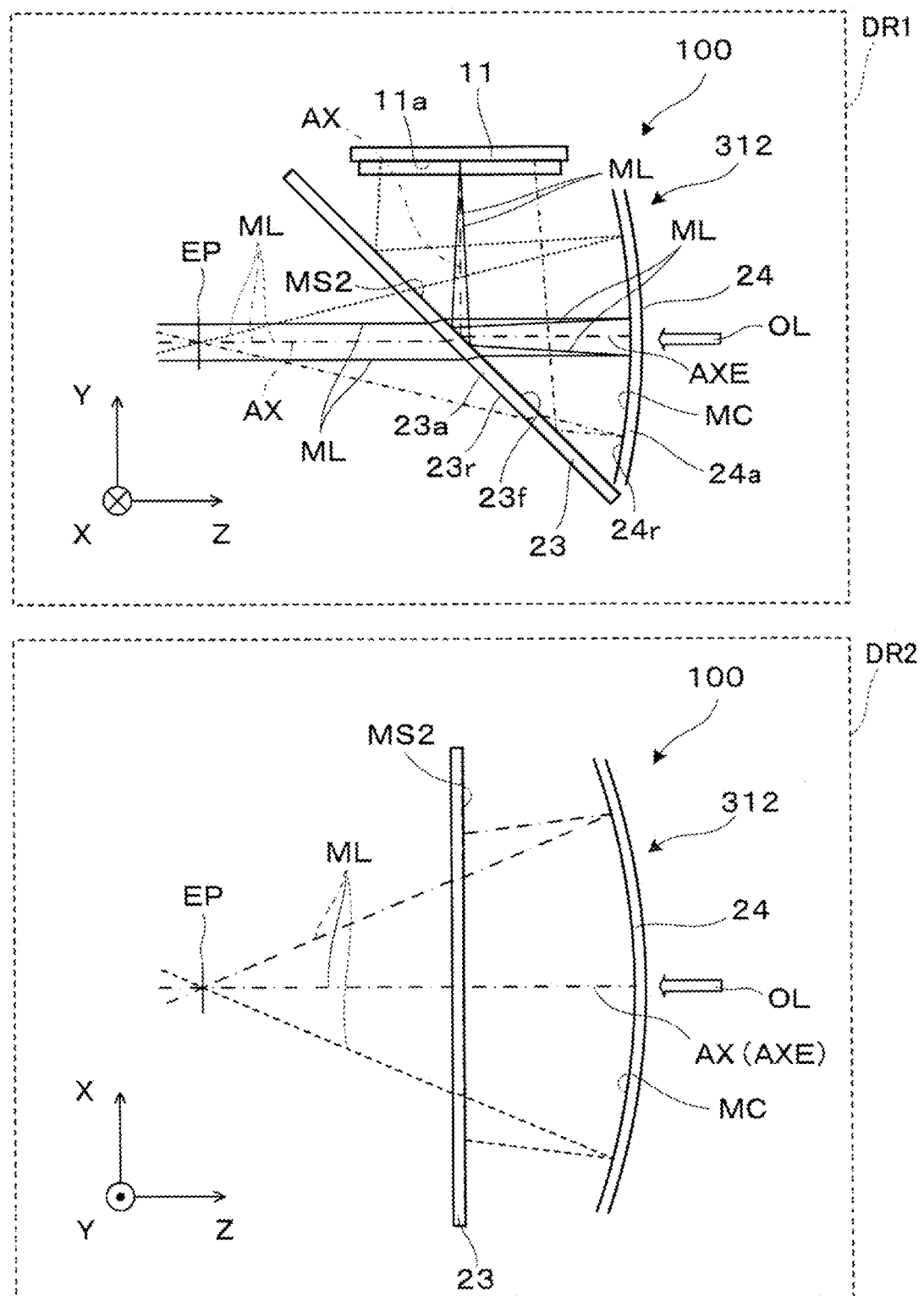
FIG. 11 is a side sectional view and a partial sectional plan view of the virtual image display device of FIG. 10.

With reference to FIG. 10 and FIG. 11, the virtual image display device of the third embodiment is described below. FIG. 10 is a schematic perspective view illustrating a structure of the virtual image display device 100. In FIG. 11, a first region DR1 is a side view of the image light generation device 11 and an optical unit 312, and a second region DR2 is a plan view illustrating a partial cross section along light paths of the image light generation device 11 and the optical unit 312.

The optical unit 312 includes the transmissive tilted mirror 23 and the concave transmissive mirror 24. That is, in the virtual image display device of the third embodiment, the image light ML is caused to impinge on the concave transmissive mirror 24 without forming an intermediate image.

Regarding the light paths, the image light ML from the image light generation device 11 impinges on the transmissive tilted mirror 23. The image light ML that is reflected by, for example, approximately 50% at the transmissive tilted mirror 23 impinges on the concave transmissive mirror 24 so as to be reflected at the transmissive reflective surface MC at a reflectance of approximately 50% or less, for example. The image light ML reflected by the concave transmissive mirror 24 impinges on the exit pupil EP where the eye EY or the pupil hole of the wearer US is located. External light OL transmitted through the concave transmissive mirror 24 also impinges on the exit pupil EP. That is, the wearer US wearing the HMD 200 can observe a virtual image of the image light ML superimposed on external images.

In the optical unit 312, the concave transmissive mirror 24 has the same structure as that illustrated in FIGS. 4 to 7. In addition, the shade 51 illustrated in FIG. 8 can be detachably disposed on the external side of the concave transmissive mirror 24.

Fourth Embodiment

A virtual image display device of a fourth embodiment is described below. The virtual image display device and the like of the fourth embodiment are obtained by partially changing the virtual image display device of the first embodiment, and therefore the description for the common portions is omitted.

Figure 12:
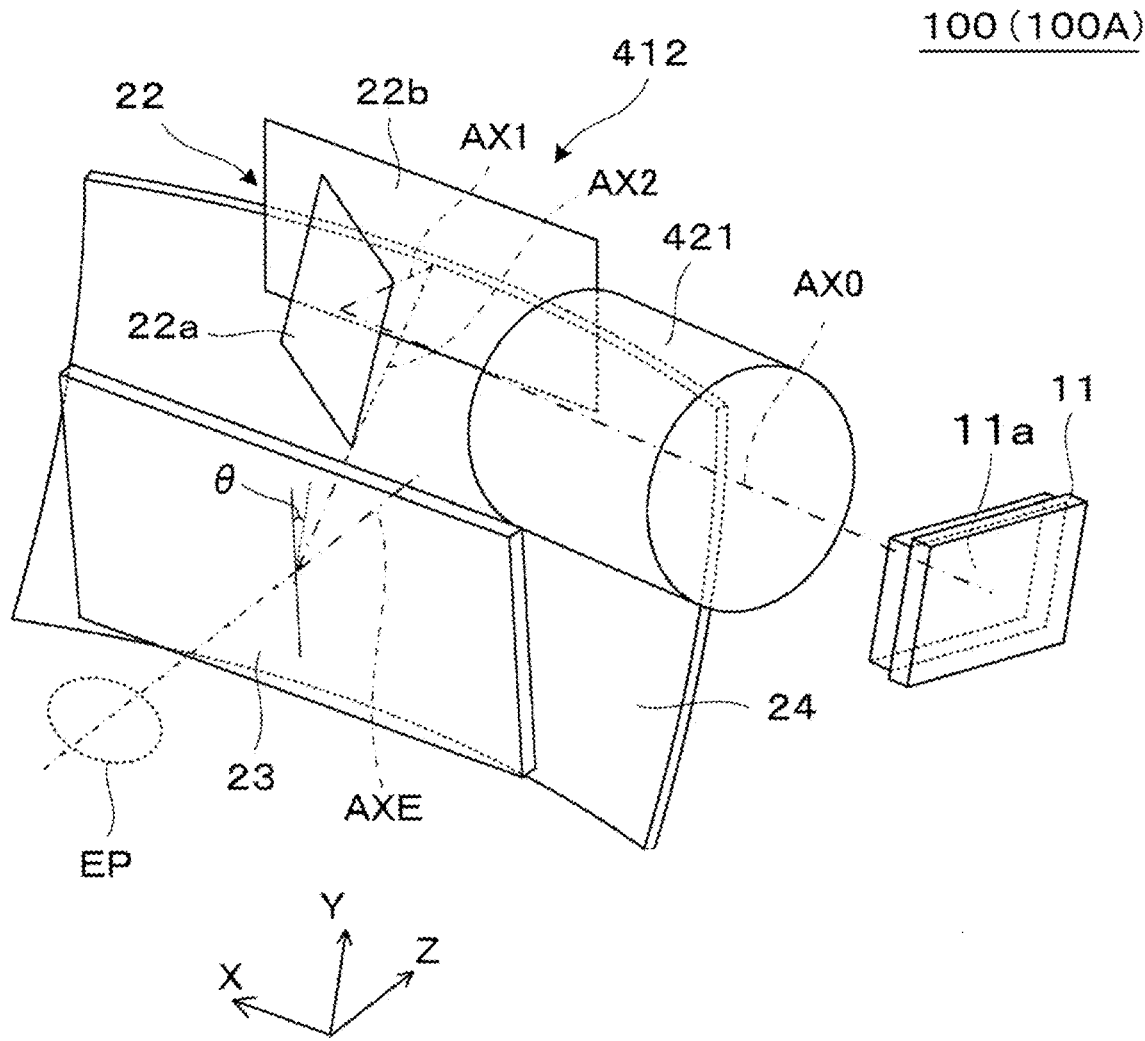
FIG. 12 is a schematic perspective view for describing a structure of a virtual image display device of a fourth embodiment.

With reference to FIG. 12, the virtual image display device of the fourth embodiment is described below. An optical unit 412 includes a projection optical system 421, a turning mirror 22, the transmissive tilted mirror 23, and the concave transmissive mirror 24. Specifically, the turning mirror 22 is disposed between the projection optical system 421 and the transmissive tilted mirror 23.

The turning mirror 22 includes a first mirror 22a and a second mirror 22b in the order of the light path from the image light generation device 11. The turning mirror 22 reflects, in the intersection direction, the image light ML from the projection optical system 421. On the light emission side of the second mirror 22b, the transmissive tilted mirror 23 is disposed. A projection optical axis AX0, which is an optical axis of the projection optical system 421, extends in parallel with the X-axis direction of the lateral direction. The light path is bent by the first mirror 22a along the reflection optical axis AX1 from the projection optical axis AX0, and the light path is bent by the second mirror 22b along the reflection optical axis AX2 from the reflection optical axis AX1. As a result, the optical axis extended in an approximately horizontal direction on the emission side of the projection optical system 421 extends in an almost vertical direction on the incident side of the transmissive tilted mirror 23.

With respect to the XY plane extending in the vertical direction as a reference, the transmissive tilted mirror 23 is tilted at an angle θ=approximately 20 to 40° in the counterclockwise direction around the X axis as viewed from the −X side. The light path from the image light generation device 11 to the turning mirror 22 is disposed on the upper side of the transmissive tilted mirror 23. To be more specific, the image light generation device 11, the projection optical system 421, and the turning mirror 22 are disposed in a space sandwiched between a tilted plane extended from the transmissive tilted mirror 23 and a vertical plane extended upward from the upper end of the concave transmissive mirror 24.

In the optical unit 412, the concave transmissive mirror 24 has the same structure as that illustrated in FIGS. 4 to 7. In addition, the shade 51 illustrated in FIG. 8 can be detachably disposed on the external side of the concave transmissive mirror 24.

Fifth Embodiment

A virtual image display device of a fifth embodiment is described below. The virtual image display device and the like of the fifth embodiment are obtained by partially changing the virtual image display device of the first embodiment, and therefore the description for the common portions is omitted.

Figure 13:
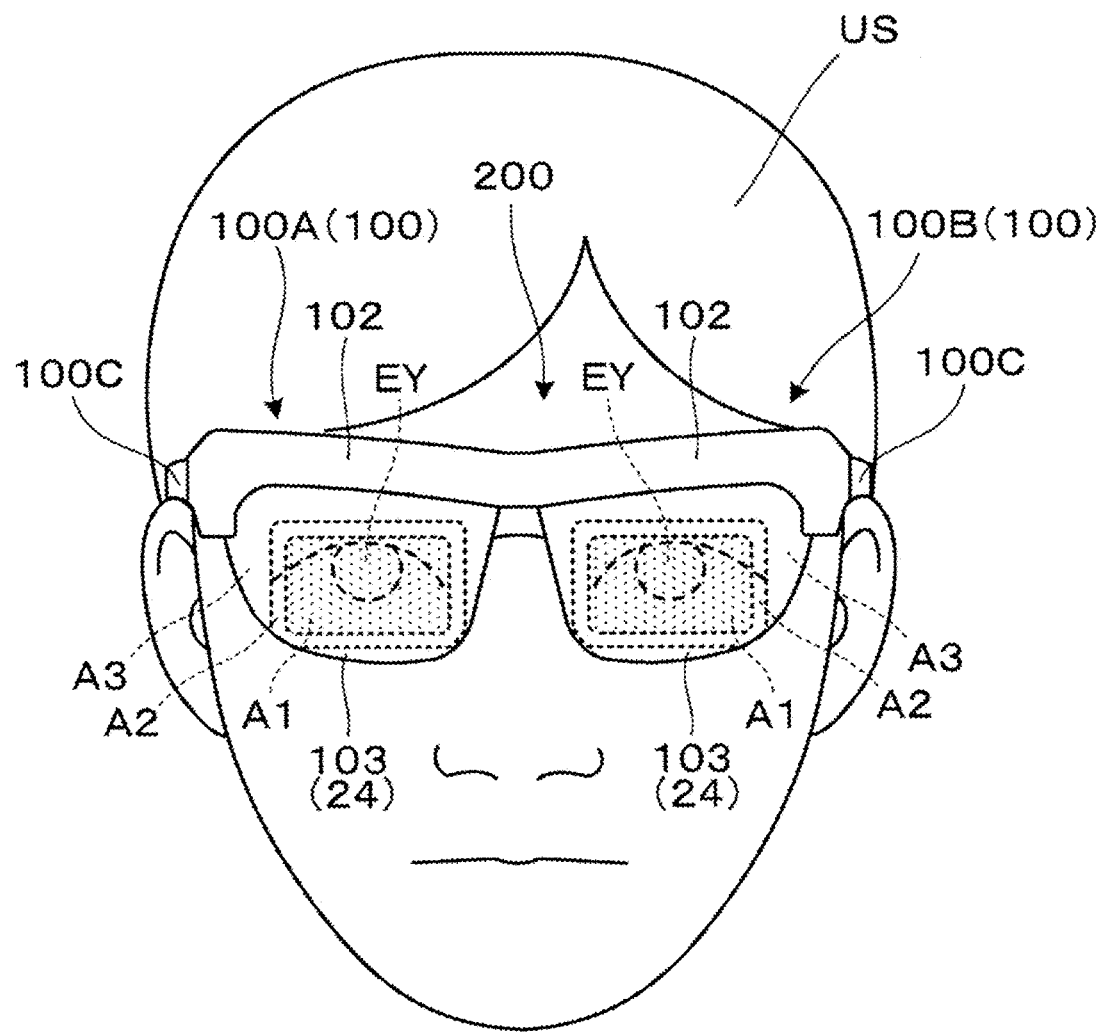
FIG. 13 is a front view for describing a virtual image display device of a fifth embodiment.

With reference to FIG. 13, the virtual image display device of the fifth embodiment is described below. In the present embodiment, the transmissive reflective surface MC is formed in the region A1 that faces the transmissive tilted mirror 23 in the concave transmissive mirror 24, and the light shielding pattern film 41 is formed in a substantially rectangular shape so as to cover the transmissive reflective surface MC in the direction of the emission light axis AXE on the external side of the transmissive reflective surface MC. In the regions A2 and A3 around the region A1, a reflectance transition region whose reflectance gradually decreases with respect to the transmissive reflective surface MC may be formed, or an absorptivity transition region or a reflectance transition region whose absorptivity or reflectance gradually decreases with respect to the light shielding pattern film 41 may be formed.

In the present embodiment, the concave transmissive mirror 24 has the same structure as that illustrated in FIGS. 4 to 7. In addition, the shade 51 illustrated in FIG. 8 can be detachably disposed on the external side of the concave transmissive mirror 24.

Modification and So Forth

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

While the virtual image display device 100 of the above-mentioned embodiments uses self-luminous display devices such as organic EL elements and other light modulation elements such as LCDs as the image light generation device 11, it is also possible to adopt a configuration using a laser scanner including a combination of a laser light source and a scanner such as a polygon mirror, in place of the above-mentioned configuration. Specifically, the present disclosure is applicable to a head-mounted display of a laser retinal projection type.

The transmissive member 24a that constitutes the concave transmissive mirror 24 is not limited to a resin material, and may be formed of glass and/or synthetic quartz.

The optical unit 12 may be an optical system including a light guide, a prism, a complex of a prism and a mirror, and the like in the preceding stage of the transmissive tilted mirror 23.

The concave transmissive mirror 24 may be provided with, in place of the transmissive reflective film 24b, a partial reflective whose reflectance is increased in a plurality of wavelength bands with a function of a band reflection filter or a function of a notch filter.

A virtual image display device of a specific aspect includes an image light generation device, a transmissive tilted mirror configured to reflect image light from the image light generation device, and a concave transmissive mirror configured to reflect, toward the transmissive tilted mirror, the image light reflected by the transmissive tilted mirror. A light shielding pattern film configured to perform partial light shielding is provided on an external side of a transmissive reflective surface formed in the concave transmissive mirror. Here, the light shielding pattern film includes one discretely formed in the surface of the concave transmissive mirror.

Since the above-mentioned virtual image display device includes a light shielding pattern film configured to perform partial light shielding on the external side of the transmissive reflective surface formed in the concave transmissive mirror, the image light transmitted through the transmissive reflective surface and emitted to the external side is reduced by the light shielding pattern film, and the image being displayed is less seen from the outside, thus increasing of the effect of suppressing information leakage. It is to be noted that through the use of the transmissive tilted mirror, the weight of the optical system of the virtual image display device can be reduced in comparison with a case where a prism member is used.

In a specific aspect, the light shielding pattern film is formed in an emission side surface of the concave transmissive mirror. With the light shielding pattern film formed on the emission side surface of the concave transmissive mirror, the image light transmitted through the transmissive reflective surface is reduced.

In another specific aspect, the light shielding pattern film includes a light reduction region and a transmissive region. In this case, the image light transmitted through the transmissive reflective surface can be reduced using the light reduction region.

In a still another specific aspect, the light reduction region is a region in which a plurality of pattern elements having a pitch of 100 μm or greater is two-dimensionally arranged. In this case, generation of diffraction at the light shielding pattern film can be suppressed.

In a still another specific aspect, the light reduction region includes one of a pattern element of a full absorption and a pattern element of a partial absorption. In this case, the absorptivity at the light shielding pattern film can be adjusted by the installation, shape, pitch, area occupancy in the entirety of the transmissive reflective surface and the like of the pattern element.

In a still another specific aspect, the light reduction region includes one of a pattern element of a total reflection and a pattern element of a partial reflection. In this case, the reflectance at the light shielding pattern film can be adjusted by the installation, shape, pitch, area occupancy in the entirety of the transmissive reflective surface and the like of the pattern element.

In a still another specific aspect, the transmissive reflective surface is formed in a region that faces the transmissive tilted mirror in the concave transmissive mirror, and the light shielding pattern film is formed in a substantially rectangular shape covering the transmissive reflective surface in a direction of an emission light axis, on the external side of the transmissive reflective surface.

In a still another specific aspect, an anti-reflection film is formed to cover the light shielding pattern film.

In still another specific aspect, the concave transmissive mirror reflects the image light toward the transmissive tilted mirror to form an exit pupil.

In still another specific aspect, the virtual image display device further includes a shade spaced apart from the concave transmissive mirror on the external side of the concave transmissive mirror. In this case, with the shade, the image light emitted to the outside of the virtual image display device can be reduced, and the effect of preventing information leakage can be further increased.

In a still another specific aspect, the shade includes the light shielding pattern film. The shade may perform light shielding using a mirror having transmissivity, but may perform light shielding using the above-mentioned light shielding pattern film.

In a still another specific aspect, the shade is provided in a region that covers the transmissive reflective surface provided on an inner side of the concave transmissive mirror.

In a still another specific aspect, the transmissive reflective surface is formed in a region that faces the transmissive tilted mirror in the concave transmissive mirror, and the light shielding pattern film is formed in a substantially rectangular shape covering the transmissive reflective surface in a direction of an emission light axis, on the external side of the transmissive reflective surface.

In still another specific aspect, an emission light axis extending from the transmissive tilted mirror toward the concave transmissive mirror is set to a forward and downward direction with respect to a horizontal axis.

In still another specific aspect, the virtual image display device further includes a turning mirror configured to reflect, in an intersection direction, the image light from the image light generation device. In this case, it is possible to easily prevent the image light generation device and associated optical elements from largely protruding upward and rearward of the transmissive tilted mirror, and the virtual image display device can be downsized, thus achieving a slender exterior appearance.

In still another specific aspect, the virtual image display device further includes a projection optical system disposed between the image light generation device and the transmissive tilted mirror and configured to form an intermediate image. In this case, the image quality can be increased while downsizing the image light generation device with the projection optical system.

In still another specific aspect, the image light impinges on the concave transmissive mirror without forming an intermediate image.

An optical unit of a specific aspect includes a transmissive tilted mirror configured to reflect image light, and a concave transmissive mirror configured to reflect, toward the transmissive tilted mirror, the image light reflected by the transmissive tilted mirror. A light shielding pattern film configured to perform partial light shielding is provided on an external side of a transmissive reflective surface formed in the concave transmissive mirror.

Since the above-mentioned optical unit includes a light shielding pattern film configured to perform partial light shielding on the external side of the transmissive reflective surface formed in the concave transmissive mirror, the image light transmitted through the transmissive reflective surface and emitted to the external side is reduced by the light shielding pattern film, and the image being displayed is less seen from the outside, thus increasing of the effect of suppressing information leakage. It is to be noted that through the use of the transmissive tilted mirror, the weight of the optical system of the optical unit can be reduced in comparison with a case where a prism member is used.

What is claimed is:

1. A virtual image display device comprising:
an image light generation device generating image light;
a first mirror reflecting the image light from the image light generation device; and
a second mirror having a concave shape and reflecting, toward the first mirror, the image light reflected by the first mirror,
wherein the second mirror includes a transmissive member, a reflection film, and a light shielding film,
the transmissive member includes a first surface and a second surface opposing to the first surface,
the reflection film, on which the image light reflected by the first mirror is incident, is provided along the first surface of the transmissive member,
the light shielding film shields a part of the image light, the light shielding pattern film is provided along the second surface of the transmissive member,
the light shielding film includes a light reduction region reducing the image light and a transmissive region transmitting the image light, and
the light reduction region includes a first pattern element and a second pattern element in two-dimensionally arranged, a distance from the first pattern element to the second pattern element is 100 μm or greater.

2. The virtual image display device according to claim 1, wherein the second surface of the transmissive member is an emission side surface of the mirror.

3. The virtual image display device according to claim 1, wherein
the light shielding film is a substantially rectangular shape covering the reflection film corresponding to a direction of an emission light axis that extends from the first mirror toward the second mirror.

4. The virtual image display device according to claim 1, wherein the second mirror includes an anti-reflection film, the light shielding film is provided between the transmissive member and the anti-reflection film.

5. The virtual image display device according to claim 1, wherein the second mirror reflects the image light toward the first mirror to form an exit pupil.

6. The virtual image display device according to claim 1, further comprising a shade spaced apart from the second mirror,
the second mirror is disposed between the first mirror and the shade.

7. The virtual image display device according to claim 1, wherein an emission light axis extending from the first mirror toward the second mirror is inclined to downward direction with respect to a horizontal axis.

8. The virtual image display device according to claim 1, further comprising: a third mirror reflecting, to an intersection direction, the image light from the image light generation device.

9. The virtual image display device according to claim 1, further comprising: a projection optical system being disposed between the image light generation device and the first mirror, the projection optical forming an intermediate image.

10. The virtual image display device according to claim 1, wherein the image light is entered to the second mirror without forming an intermediate image.

11. A virtual image display device comprising:
an image light generation device generating image light;
a first mirror reflecting the image light from the image light generation device; and
a second mirror having a concave shape and reflecting, toward the first mirror, the image light reflected by the first mirror,
wherein the second mirror includes a transmissive member, a reflection film, and a light shielding film,
the transmissive member includes a first surface and a second surface opposing to the first surface,
the reflection film, on which the image light reflected by the first mirror is incident, is provided along the first surface of the transmissive member,
the light shielding film shields a part of the image light, the light shielding pattern film is provided along the second surface of the transmissive member,
the light shielding film includes a light reduction region reducing the image light and a transmissive region transmitting the image light, and
the light reduction region includes one of a pattern element absorbing full the image light or a pattern element absorbing a part of the image light.

12. An optical unit comprising:
a first mirror reflecting image light; and
a second mirror having a concave shape and reflecting, toward the first mirror, the image light reflected by the first mirror,
wherein
the second mirror includes a transmissive member, a reflection film, and a light shielding film,
the transmissive member includes a first surface and a second surface opposing to the first surface,
the reflection film, on which the image light reflected by the first mirror is incident, is provided along the first surface of the transmissive member,
the light shielding film shields a part of the image light, the light shielding film is provided along the second surface of the transmissive member,
the light shielding film includes a light reduction region reducing the image light and a transmissive region transmitting the image light, and
the light reduction region includes a first pattern element and a second pattern element in two-dimensionally arranged, a distance from the first pattern element to the second pattern element is 100 μm or greater.

* * * * *